(12) United States Patent
Kim et al.

(10) Patent No.: US 6,254,249 B1
(45) Date of Patent: Jul. 3, 2001

(54) CELLULAR PHONE CAPABLE OF READING MEMORANDUM IN A DARK AREA

(76) Inventors: Seong-Soo Kim, 109-606 Purunmaeul Apt., Suseo 13 Block, Ilwon-Dong, Kangnam-Gu, Seoul; Chi-Man Park, 706 Majeon-Ri, Chubu-Myun, Kumsan-Gun, Chungcheongnam-Do, both of (KR)

(*) Notice: Subject to any disclaimer, the term of this patent is extended or adjusted under 35 U.S.C. 154(b) by 0 days.

(21) Appl. No.: 09/359,052

(22) Filed: Jul. 21, 1999

(30) Foreign Application Priority Data

Feb. 26, 1999 (KR) .................................................. 99-6534

(51) Int. Cl.⁷ ...................................................... F21V 33/00
(52) U.S. Cl. .............................. 362/109; 362/88; 362/24; 455/575
(58) Field of Search ................................ 362/109, 88, 85, 362/29, 24, 23; 375/440, 433; 455/575

(56) References Cited

U.S. PATENT DOCUMENTS

| | | | |
|---|---|---|---|
| 5,901,206 | * | 5/1999 | Soon ................................ 379/110.01 |
| 5,918,188 | * | 6/1999 | Doran .................................... 455/575 |

\* cited by examiner

*Primary Examiner*—Sandra O'Shea
*Assistant Examiner*—Ronald E. DelGizzi
(74) *Attorney, Agent, or Firm*—Marger Johnson & McCollom, B.C.

(57) ABSTRACT

A cellular phone with lamps comprising first, second and third illuminating lamps, an illuminating button, a cover open/close detecting unit and a control unit, for use as memorandum reading and flash light functions and for use as a lamp for illuminating an entire area of a key pad, thereby simplifying structure and reducing thickness of the cellular phone.

9 Claims, 7 Drawing Sheets

CELLULAR PHONE CAPABLE OF READING MEMORANDUM IN A DARK AREA

BACKGROUND OF THE INVENTION

1. Field of the Invention

The present invention relates to a cellular phone, and more particularly to a cellular phone with lamps for use as a memorandum reading lamp and having a flash light function.

2. Description of the Prior Art

Recently, cellular phones have become very popular. The cellular phones allow cellular phone users to communicate with other people by radio even while driving or walking.

However, since conventional cellular phones have only the communication function, it is difficult for the users to read telephone numbers written on a memorandum pad or on a name card in a dark area.

Furthermore, there is another problem in the cellular phones according to the prior art in that lamps are provided underneath each button of a key pad for lighting the key pad, such that structure thereof is very complicated and manufacturing process also gets complicated. There is still another problem in that the cellular phones gets thicker due to mounted lamp.

SUMMARY OF THE INVENTION

The present invention is disclosed to solve the aforementioned problems and it is an object of the present invention to provide a cellular phone with lamps for use as a memorandum reading lamp and a flash light function by installing an illuminating lamp for an outside lighting.

It is another object of the present invention to provide a cellular phone with lamps for use as a flash by installing an illuminating lamp for an outside lighting.

It is still another object of the present invention to provide a cellular phone with lamps for pad, thereby simplifying the structure thereof and reducing thickness thereof.

In accordance with one object of the present invention, there is provided a cellular phone with lamps, the cellular phone comprises an illuminating lamp mounted on outside surface of a body thereof, an illuminating button for lighting on and off the illuminating lamp, a power supply unit for supplying a power to the illuminating lamp, and a control unit for supplying a power to the illuminating lamp to light on and off the illuminating lamp when the illuminating button is turned on.

In accordance with another object of the present invention, there is provided a cellular phone with lamps, the cellular phone having a cover for opening and closing a key pad mounted thereon being coupled to the body via a hinge, wherein the cellular phone with lamps comprises an illuminating lamp for lighting the key pad, a cover open/close detecting unit for detecting whether the cover is opened or closed, a power supply unit for supplying a power to the illuminating lamp, and a control unit for supplying the power to the illuminating lamp to light on and off the illuminating lamp when it is discriminated by the cover open/close detecting unit that the cover is opened.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Preferred embodiments of the present invention will now be described in detail with reference to the accompanying drawings.

Figure 1:
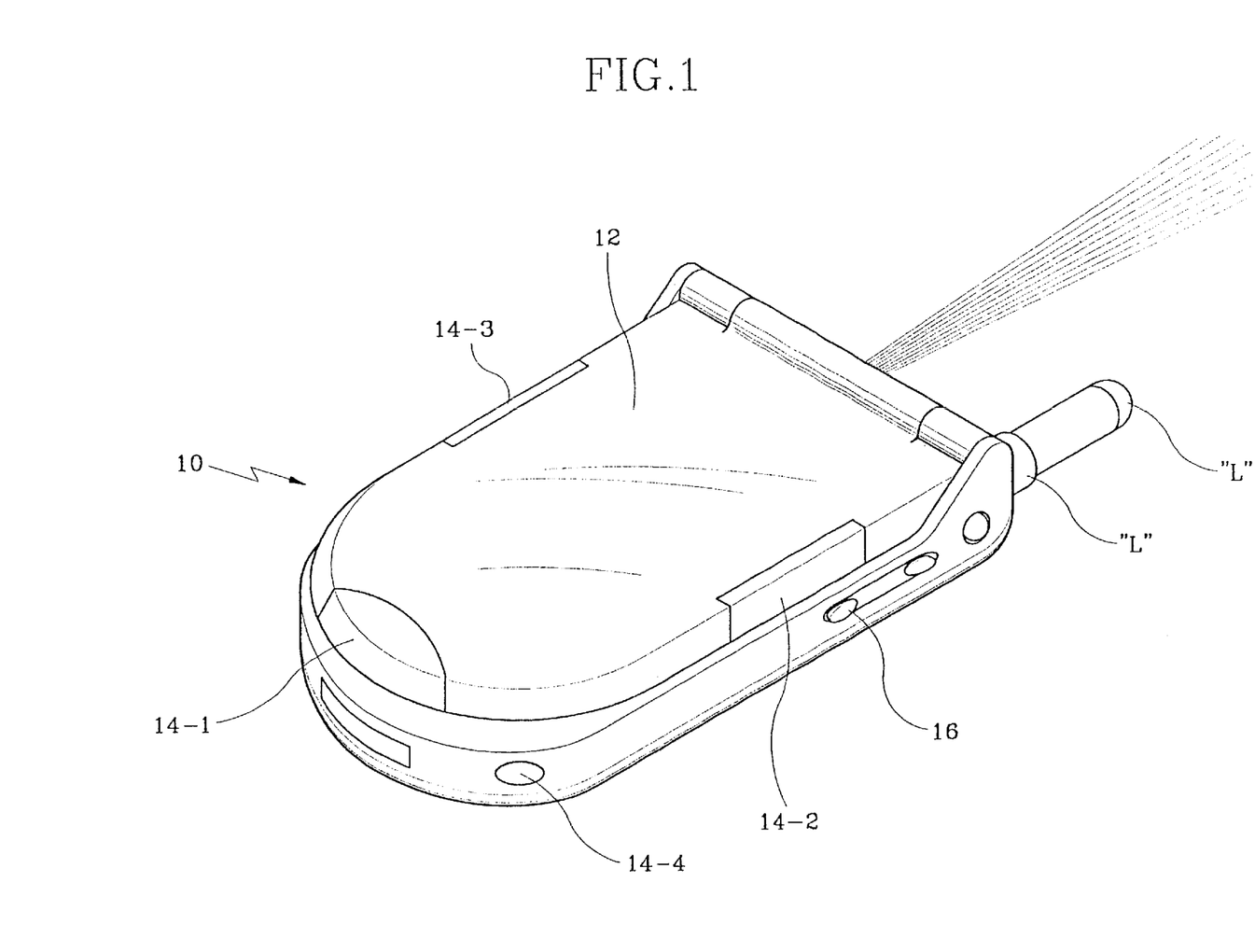
FIG. 1 is a perspective view for illustrating a cellular phone with lamps according to the present invention.
Figure 2:
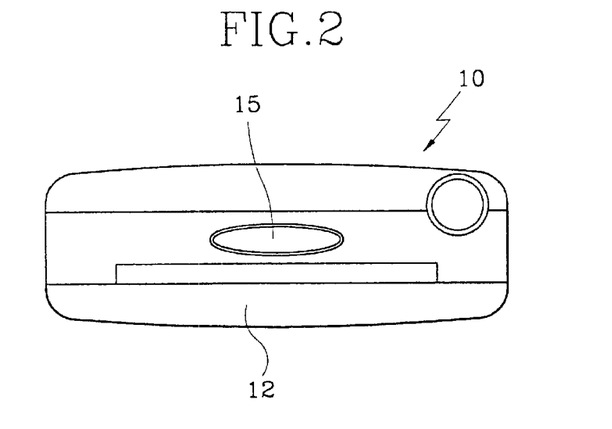
FIG. 2 is a plan view for illustrating a cellular phone with lamps according to the present invention.
Figure 3:
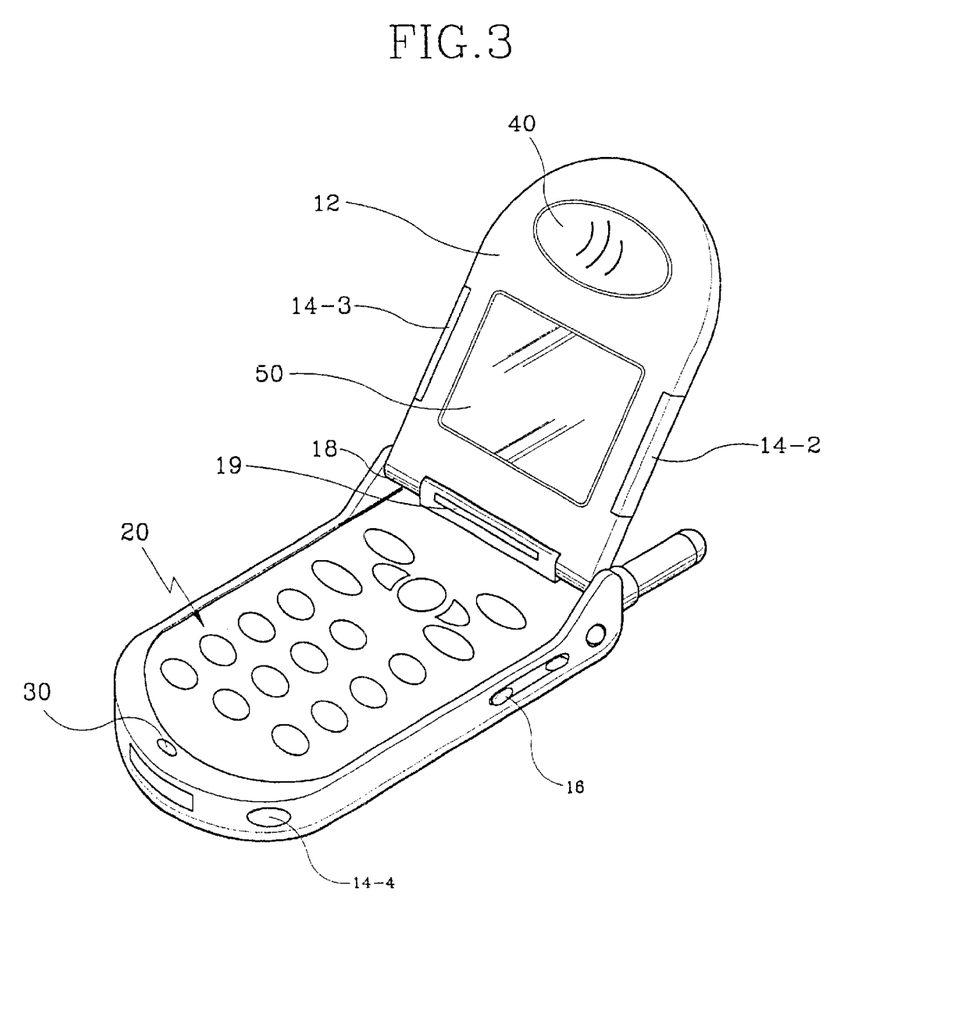
FIG. 3 is a perspective view for illustrating a cellular phone with lamps according to the present invention where its cover is open.

FIG. 1 is a perspective view for illustrating a cellular phone with lamps according to the present invention, FIG. 2 is a plan view for illustrating a cellular phone with lamps according to the present invention and FIG. 3 is a perspective view for illustrating a cellular phone with lamps according to the present invention, where its cover is open.

As illustrated in FIGS. 1, 2 and 3, the cellular phone according to the present invention includes a body 10 which is in turn provided with a cover 12, a key pad 20 and a microphone 30. The cover 12 is mounted with a speaker 40 and a display unit 50, and is rotatably coupled to the body 10 via a hinge 18.

First illuminating lamps (14-1, 14-2, 14-3 and 14-4) are respectively arranged at a lower side and both sides of the cover 12 and at a lower corner area of the body 10 for use as memorandum reading lamps. Although the present invention has described a cellular phone with a plurality of illuminating lamps, it should be noted that the present invention is not limited thereto but various changes and modifications can be embodiment to include at least one lamp.

Furthermore, the body 10 is provided thereon with a second illuminating lamp 15 for use in an emergency and the hinge 18 is centrally mounted with a third illuminating lamp 19 for lighting the key pad 20. The body 10 is arranged at one side thereof with an illuminating button 16.

Figure 4:
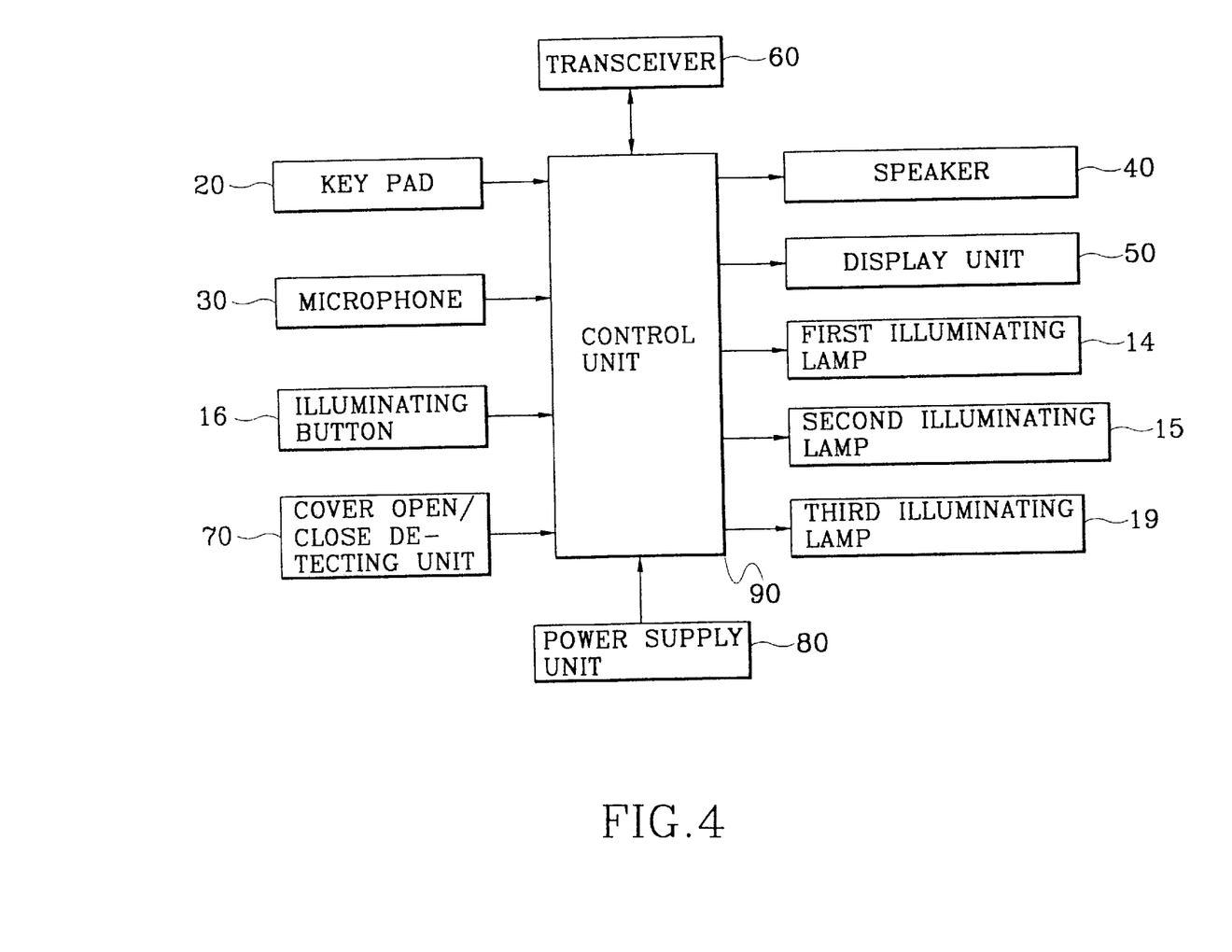
FIG. 4 is a block diagram for illustrating a cellular phone with lamps according to the present invention.

Meanwhile, FIG. 4 is a block diagram for illustrating a cellular phone with lamps according to the present invention, where the cellular phone according to the present invention includes a first illuminating lamp 14, a second illuminating lamp 15, an illuminating button 16, a third illuminating lamp 19, a key pad 20, a microphone 30, a speaker 40, a display unit 50, a transceiver 60, a cover open/close detecting unit 70, a power supply unit 80 and a control unit 90

The key pad 20 serves to input to the control unit 90 various operational signals and letter information for operating the cellular phone according to a user's manipulation, the microphone 30 serves to input to the transceiver 60 a voice signal of the user according to control of the control unit 90, the speaker 40 reproduces a voice signal of the other party received through the transceiver 60 according to the control of the control unit 90 to thereafter output same, and the display unit 50 displays operational state of the cellular phone and various letter information according to the control of the control unit 90.

The transceiver 60 serves to communicate the other party via a radio relay station according to the control of the control unit 90 and the power supply unit 80 supplies a power necessary for operating the cellular phone.

Furthermore, the illuminating button 16 sends to the control unit 90 a signal for lighting on or off the first and second illuminating lamps 14 and 15 according to the manipulation of the user, and the cover open/close detecting unit 70 detects an open/close state of the cover 12 to send information thereof to the control unit 90.

The control unit 90 communicatively controls the overall operations of the cellular phone according to various manipulated signals input through the key pad 20, supplies to the first illuminating lamp 14 the power supplied from the power supply unit 80 when the illuminating button 16 is turned on in a state of the cover 12 being opened according to discrimination by the cover open/close detecting unit 70, to thereby light on the first illuminating lamp 14, and supplies to the second illuminating lamp 15 the power supplied from the power supply unit 80 when the illuminating button 16 is turned on in a state of the cover 12 being closed according to discrimination by the cover/close detecting unit 70, to thereby light on the second illuminating lamp 15, and supplies power to the third illuminating lamp 19 when it is discriminated by the cover open/close detecting unit 70 that the cover 12 is opened, to thereby light on the third illuminating lamp 19.

Figure 8:
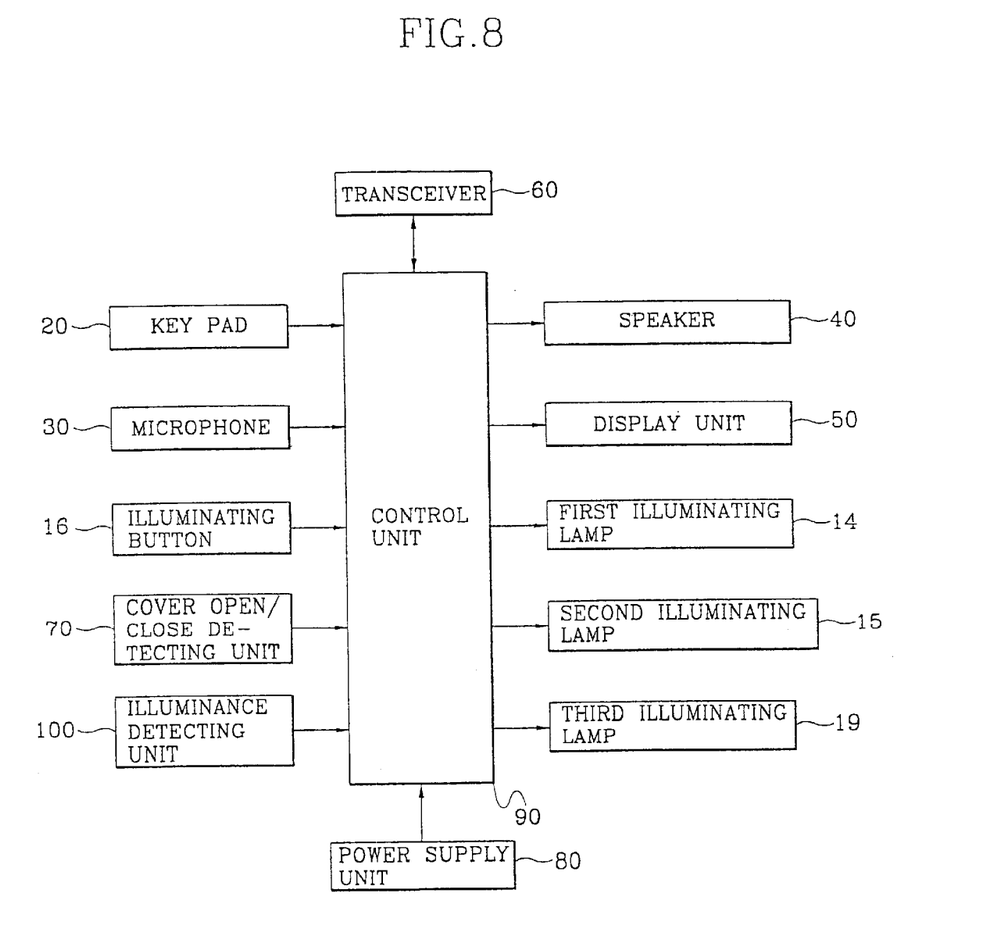
FIG. 8 is a block diagram for illustrating a cellular phone with lamps according another embodiment of the present invention.

Meanwhile, FIG. 8 is a block diagram for illustrating a cellular phone with lamps according to another embodiment of the present invention, where like reference numerals and symbols are used for designation of like or equivalent parts or portions as in FIG. 4.

As illustrated in FIG. 8, the cellular phone with lamps according to another embodiment of the present invention is further equipped with an illuminance detecting unit 100 and other constructions are the same as those in FIG. 4.

The illuminance detecting unit 100 serves to detect an illuminance to input same to the control unit 90, where the control unit 90 does not light up the first, second and third illuminating lamps 14, 15 an 19 if the illuminance detected and input by the illuminance detecting unit 100 is above a pre-set up illuminance value.

Now, operational effect of the cellular phone with lamps according to the present invention thus constructed will be described in detail.

When a user opens the cover 12, the cover open/close detecting unit 70 detects it to send same to the control unit 90, and when the user turns on the illuminating button 16 in this state, the control unit 90 supplies to the first illuminating lamp 14 the power supplied from the power supply unit 80 to light on the first illuminating lamp 14.

At this time, the control unit 90 supplies the power to the first illuminating button 14 only when the illuminating button 16 is actuated i.e. turned on, and when the illuminating lamp 16 is turned on for a short period of time (by way of example, 0.5 second) and then is turned on again for a little bit longer period of time (by way of example, 2 seconds), the control unit 90 continues to light on the first illuminating lamp 14 for a predetermined period of time (by way of example, 30 seconds).

Figure 5:
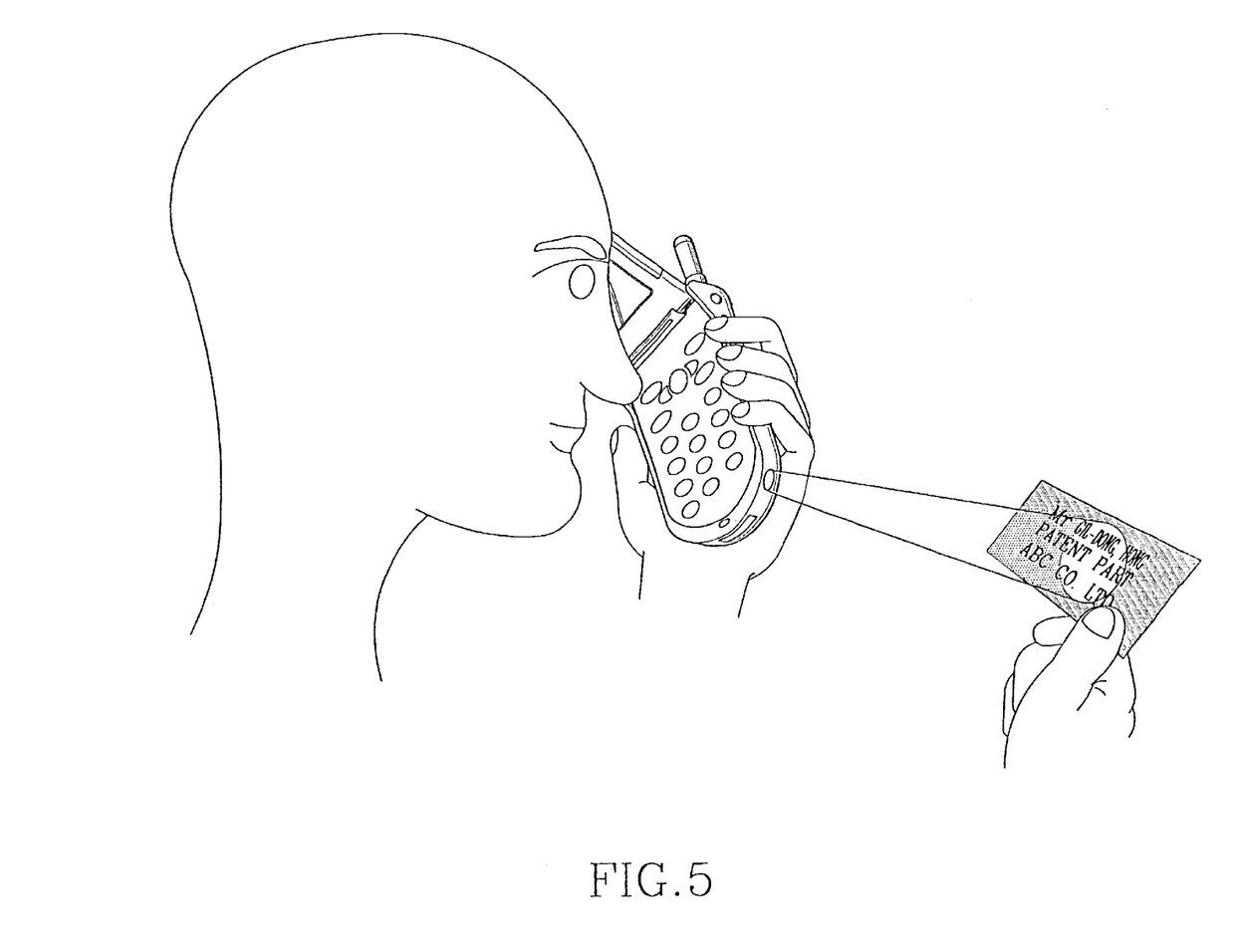
FIGS. 5, 6 and 7 are a constitutional diagram for illustrating a cellular phone with lamps for use according to the present invention.

Successively, when the first illuminating lamp 14 is lighted on and off, the PATENT APPLICATION 5/10 MJM Do. No. 5387-2 lamp 14 serves to function as a memorandum reading lamp in a dark area, as illustrated in FIG. 5.

At this time, it should be noted that the first illuminating lamp 14 can be positioned at an appropriate portion of the cellular phone to make it easy for a user to read a memorandum in a dark place, and the first illustrating lamp 14 is preferred to be installed at a lower comer portion of the body 10 to allow a user to communicate with the third party and to simultaneously check a memorandum.

Meanwhile, when the cover 12 is closed, the cover open/close detecting unit 70 detects it to send information thereof to the control unit 90, and when a user turns on the illuminating button 16 in this state, the control unit 90 supplies to the second illuminating lamp 15 the power supplied from the power supply unit 80, thereby lighting on the second illuminating lamp 15.

Figure 6:
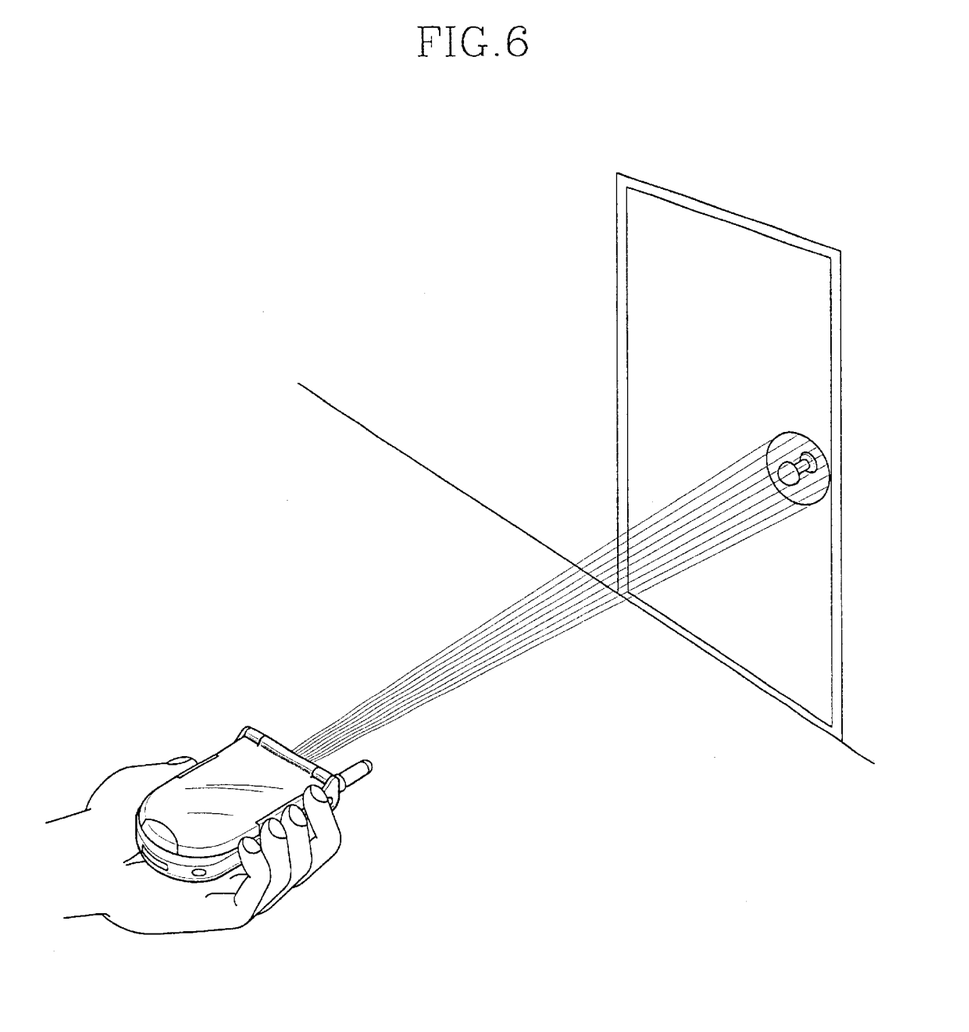

Successively, when the second illuminating lamp 15 is lighted on as mentioned above, the second illuminating lamp 15 functions as a flash light for use in an emergency, as illustrated in FIG. 6.

Meanwhile, when a user opens the cover 12, the cover open/close detecting unit 70 detects it to send information thereof to the control unit 90, where the control unit 90 supplies to the third illuminating lamp 19 the power supplied from the power supply unit 80 to light on the third illuminating lamp 19 when the cover 12 is discriminated to be opened by the cover open/close detecting unit 70.

Figure 7:
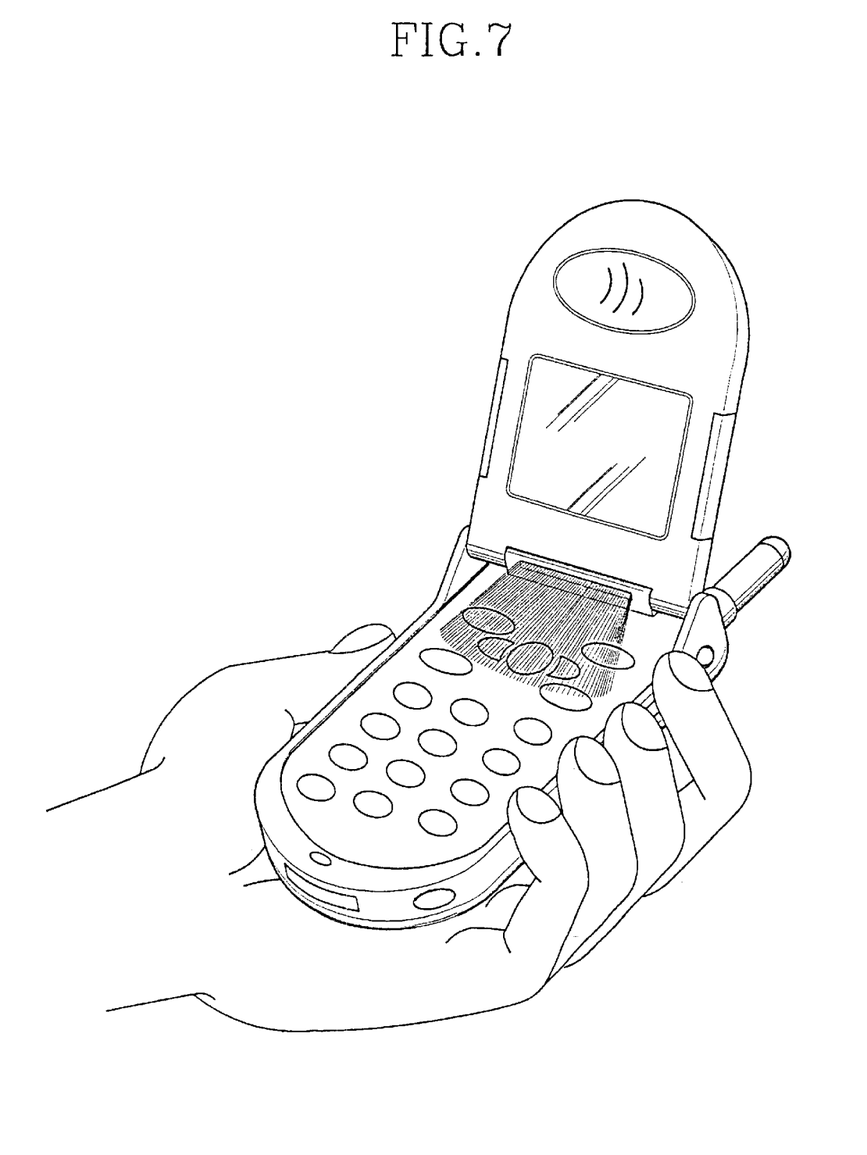

At this time, because the third illuminating lamp 19 is centrally positioned at the hinge 18, the key pad 20 is well lighted to allow a user to recognize and manipulate each button on the key pad 20 even in a dark place, as illustrated in FIG. 7.

Meanwhile, in the cellular phone with lamps according to another embodiment of the present invention, the illuminance detecting unit 100 serves to detect an illuminance to input same to the control unit 90, where the control unit 90 does not light up the first, second and third illuminating lamps 14, 15 and 19 if the illuminance detected and input by the illuminance detecting unit 100 is above a pre-set illuminance value. In other words, if the illuminance detected and input by the illuminance detecting unit 100 is above the pre-set illuminance value, the control unit 90 does not light up the first and second illuminating lamps 14 and 15 even if the illuminating button 16 is pressed on, and does not light up the third illuminating lamp 19 either even if it is detected that the cover is opened by the cover open/close detecting unit 70.

As apparent from the foregoing, there is an advantage in the cellular phone with lamps according to the present invention in that the cellular phone is disposed with illuminating lamps for use in reading a memorandum and in outside lighting, there is another advantage in that one illuminating lamp is used to light an entire area of a key pad, thereby simplifying structure of the cellular phone and reducing thickness thereof. furthermore, there is still another advantage in that erroneous operation of illuminating lamps is prevented in advance to thereby reduce power consumption as the illuminating lamps are not operated if an external illuminance is above a pre-set illuminance value.

What is claimed is:

1. A cellular phone comprising:
    a first illuminating lamp externally positioned and oriented in such a way that a memorandum-like object can be viewed from a light from the first illuminating lamp while holding the cellular phone to converse with a third party;
    an illuminating button for turning on the first illuminating lamp;

a power supply unit for supplying power to the first illuminating lamp;

a cover open/close detecting unit for determining whether a cover of the cellular phone is opened or closed; and a control unit for supplying power to the first illuminating lamp so as to turn on the first illuminating lamp responsive to the determination of the cover open/close detecting unit that the cover is opened when the illuminating button is turned on.

2. The cellular phone as defined in claim 1, wherein the control unit continues to turn on the first illuminating lamp for an extended period of time when the illuminating button is actuated for a first predetermined period of time and then is actuated again for a second predetermined of time longer than the first predetermined period of time, wherein the extended period of time is longer than the second predetermined period of time.

3. The cellular phone as defined in claim 1, wherein the first illuminating lamp is mounted on a lower corner portion of a body of the cellular phone.

4. The cellular phone as defined in claim 1, which further comprises, a second illuminating lamp, wherein the control unit supplies power to the second illuminating lamp to turn on the second illuminating lamp when the illuminating button is turned on while the cover is determined to be closed by the cover open/close detecting unit.

5. The cellular phone as defined in claim 4, wherein the second illuminating lamp functions as a flash light for use in an emergency.

6. The cellular phone as defined in claim 1, which further comprises a third illuminating lamp for lighting a key pad mounted thereon, and the control unit supplies power to the third illuminating lamp to turn on the third illuminating lamp when it is determined by the cover open/close unit that the cover is open.

7. The cellular phone as defined in claim 1, which further comprises, an illuminance detecting unit for detecting an illuminance, and the control unit does not light up the illuminating lamps if the illuminance detected by the illuminance detecting unit is above a pre-set illuminance value.

8. A cellular phone having a cover for opening and closing a key pad mounted on a body of the cellular phone, coupled to the body via a hinge, the cellular phone comprising:

an illuminating lamp for lighting the key pad;

a cover open/close detecting unit for determining whether the cover is opened or closed;

a power supply unit for supplying a power to the illuminating lamp; and a control unit for supplying the power to the illuminating lamp to thereby turn on the illuminating lamp when it is determined by the cover open/close detecting unit that the cover is opened, wherein the illuminating lamp is provided in a center region of the hinge, positioned and oriented to light the key pad.

9. A cellular phone, comprising:

a first illuminating lamp externally mounted thereon;

an illuminating button for turning on the first illuminating lamp;

a power supply unit for supplying power to the first illuminating lamp;

a cover open/close detecting unit for determining whether a cover of the cellular phone is opened or closed;

a control unit for supplying power to the first illuminating lamp so as to turn on the first illuminating lamp responsive to the determination of the cover open/close detecting unit that the cover is opened when the illuminating button is turned on; and an illuminance detecting unit for detecting an illuminance, and the control unit does not light up the illuminating lamps if the illuminance detected by the illuminance detecting unit is above a pre-set illuminance value.

* * * * *

UNITED STATES PATENT AND TRADEMARK OFFICE
CERTIFICATE OF CORRECTION

PATENT NO.    : 6,254,249 B1
DATED         : July 3, 2001
INVENTOR(S)   : Kim et al.

It is certified that error appears in the above-identified patent and that said Letters Patent is hereby corrected as shown below:

<u>Column 3,</u>
Line 58, "illuminating lamp 16" should read -- illuminating button 16 --
Line 65, "the PATENT APPLICATION 5/10 MJM Do. No. 5327-27 lamp" should read -- the lamp --

<u>Column 5,</u>
Line 14, "second predetermined of time" should read -- second predetermined period of time --

Signed and Sealed this

Twenty-sixth Day of August, 2003

JAMES E. ROGAN
*Director of the United States Patent and Trademark Office*